US012196725B2

(12) United States Patent
Hou et al.

(10) Patent No.: US 12,196,725 B2
(45) Date of Patent: Jan. 14, 2025

(54) EVALUATION APPARATUS FOR SEAL INTEGRITY OF WELLBORES IN FULL LIFE CYCLE AND EVALUATION METHODS THEREOF

(71) Applicant: SOUTHWEST PETROLEUM UNIVERSITY, Sichuan (CN)

(72) Inventors: Duo Hou, Chengdu (CN); Zhi Zhang, Chengdu (CN); Zhongling Xiao, Chengdu (CN); Huabo Yang, Chengdu (CN); Jian Ren, Chengdu (CN); Taihe Shi, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 172 days.

(21) Appl. No.: 18/055,819

(22) Filed: Nov. 15, 2022

(65) Prior Publication Data
US 2023/0152196 A1    May 18, 2023

(30) Foreign Application Priority Data
Nov. 15, 2021    (CN) .......................... 202111348685.5

(51) Int. Cl.
*G01N 3/56*    (2006.01)
*E21B 47/005*    (2012.01)
(Continued)

(52) U.S. Cl.
CPC .............. *G01N 3/56* (2013.01); *E21B 47/005* (2020.05); *G01N 3/12* (2013.01); *G01N 25/00* (2013.01); *E21B 2200/20* (2020.05)

(58) Field of Classification Search
CPC . G01N 3/56; G01N 3/12; G01N 25/00; E21B 47/005; E21B 2200/20;
(Continued)

(56) References Cited

U.S. PATENT DOCUMENTS

2011/0094295 A1 *   4/2011   Meadows ................ G01N 3/08
                                                            73/38
2017/0205388 A1 *   7/2017   Thomas ............... G01N 33/383
(Continued)

FOREIGN PATENT DOCUMENTS

CN    104406910 A    *   3/2015
CN    108361024 A        8/2018
(Continued)

OTHER PUBLICATIONS

Notification to Grant Patent Right for Invention in Chinese Application No. 202111348685.5 mailed on Apr. 28, 2023, 6 pages.
(Continued)

*Primary Examiner* — Marrit Eyassu
(74) *Attorney, Agent, or Firm* — METIS IP LLC (57) ABSTRACT

The embodiments of the present disclosure disclose an evaluation apparatus and a method for seal integrity of a wellbore in a full life cycle. The apparatus may include an oil pipe temperature and pressure simulation assembly, an oil casing annular temperature and pressure simulation assembly, a formation confining pressure simulation assembly, a casing-cement sheath-formation combination preparation assembly, a blowby characteristic detection assembly, and a monitoring system. The present disclosure may crustal stress quickly complete scanning of cement slurry system and maintenance and preparation of casing-cement sheath-formation combination, intelligent monitor blowby pressure of cement sheath in real time, test the critical blowby pressure curve of cement sheath of oil and gas wells under various production conditions throughout the life cycle for evaluating the seal integrity of wellbore, and provide technical support for the formulation of wellbore safeguard measures.

10 Claims, 2 Drawing Sheets

(51) Int. Cl.
*G01N 3/12* (2006.01)
*G01N 25/00* (2006.01)

(58) Field of Classification Search
CPC ...... E21B 47/06; E21B 47/117; G01M 3/002; G01M 3/26; Y02E 10/10
USPC .......................................................... 73/1.57
See application file for complete search history.

(56) References Cited

U.S. PATENT DOCUMENTS

| | | |
|---|---|---|
| 2018/0010438 A1 | 1/2018 | Ravi et al. |
| 2018/0209928 A1 | 7/2018 | Li et al. |
| 2021/0246777 A1 | 8/2021 | Zhao et al. |

FOREIGN PATENT DOCUMENTS

| | | | | |
|---|---|---|---|---|
| CN | 109681190 A | * | 4/2019 | ............ E21B 33/13 |
| CN | 109931048 A | | 6/2019 | |
| CN | 210087307 U | | 2/2020 | |
| CN | 111927435 A | | 11/2020 | |
| CN | 108361024 B | * | 3/2021 | ............ E21B 47/005 |

OTHER PUBLICATIONS

Zhang, Zhi et al., Research on risk evaluation of well integrity for sour gas wells, Journal of Safety Science and Technology, 13(4): 101-107, 2017.

Song, Dejun, Wellbore Integrity Evaluation Methodfor Complex Oil and Gas Wells in Tahe Oilfield, China Master's Theses Full-text Database( Engineering Science and Technology I Series): 1-72, 2021.

Xu, Honglin et al., Influence of the WHCP on cement sheath stress and integrity in HTHP gas well, Journal of Petroleum Science and Engineering, 174-180, 2014.

Ali Taghipour et al., Novel laboratory setup for realistic wellbore cement and formation integrity studies, Journal of Petroleum Science and Engineering, 1-7, 2021.

Zhou, Shiming et al., Study on Failure Mechanism of Cement Sheath Sealing of Shale Gas Well Under Alternating Loading and the Controlling Method, International Petroleum Technology Conference, 1-9, 2019.

Guo, Yabin et al., Cementing Practices to Solve Well Integrity Challenges of Ultra Deep High Temperature Wells in Western China, Society of Petroleum Engineers, 1-19, 2016.

\* cited by examiner

EVALUATION APPARATUS FOR SEAL INTEGRITY OF WELLBORES IN FULL LIFE CYCLE AND EVALUATION METHODS THEREOF

CROSS-REFERENCE TO RELATED APPLICATION

This application claims priority of Chinese Patent Application No. 202111348685.5, filed on Nov. 15, 2021, the contents of which are entirely incorporated herein by reference.

TECHNICAL FIELD

The present disclosure relates to the technical field of mining, and in particular to evaluation apparatus for seal integrity of a wellbore in a full life cycle and evaluation methods.

BACKGROUND

Along with the continuous increase of oil and gas exploration and development efforts, cementing operations are faced with extremely harsh wellbore operation conditions such as deep wells and ultra-deep wells, high temperature and high pressure wells, injection-production wells, and geothermal wells. The cementing operation is a one-time engineering operation. After the cement slurry system is solidified, it is consolidated with the casing and the formation rock of wellbore wall to form a casing-cement sheath-formation combination, which aims to provide a good oil and gas flow channel, prevent the loss of oil and gas resources and energy and the mutual channeling of oil, gas and water outside the casing, support and protect the casing, and meet the requirements of production operations and development plans in the full life cycle. It has the features of invisible underground, difficult to remedy when problems occur, and complex influencing factors. If the sealing quality of the wellbore cannot meet the requirements of subsequent production operations such as acidizing, fracturing, layered water injection, and layered mining, it may lead to the failure of the implementation of the subsequent development plan, and even face the risk of seal integrity of the wellbore and huge economic losses.

In the process of cementing operation under extremely harsh wellbore conditions, the temperature field and pressure field of the wellbore have a wide range and large temperature and pressure fluctuations, which may easily affect the solidification quality of the cement slurry system. For example, the complex wellbore trajectory leads the cement slurry system to not completely fill the oil casing annular space to be sealed. For example, insufficient centering and eccentricity of the casing lead to the lack of cement sheath in a local well section. For example, the high water absorption of the formation leads to a large amount of water loss during the solidification of the cement slurry system, which affects the cementing quality. At the same time, the combination may bear the influence of formation and various production operation conditions in the full life cycle. For example, the cement sheath is directly affected by factors such as formation fluid erosion, casing bulging effect, pressure fluctuation of oil casing annular space, etc. In addition, the cement sheath is also indirectly affected by factors such as oil pipe temperature, pressure, fluid phase change, vibration, bulging, deformation and other production operation conditions, as well as non-uniform crustal stress of formation rocks around the well. Under the influence of the above-mentioned direct and indirect factors, there are many factors that affect the seal integrity of wellbore, and there is correlation between the factors, and the risks of seal integrity of the wellbore are different under different production operation conditions.

From the above, the evaluation of the seal integrity of the wellbore in the full life cycle under extremely harsh wellbore conditions has extremely important value in terms of theory and engineering, but there is a lack of indoor evaluation apparatus and methods that are systematically reliable and applicable to various operation conditions, resulting in the evaluation results of the seal integrity of the wellbore being not in good agreement with the actual engineering, seriously affecting the selection of cement slurry system under extremely harsh wellbore conditions such as deep wells, ultra-deep wells, high temperature and high pressure wells, injection production wells, geothermal wells, etc., improvement of cementing quality, and establishment of safeguard measures for seal integrity of the wellbore.

Therefore, it is needed to provide evaluation apparatus for seal integrity of a wellbore in a full life cycle and evaluation methods.

SUMMARY

One or more embodiments of the present disclosure provide an evaluation apparatus for seal integrity of a wellbore in a full life cycle. The evaluation apparatus may include an oil pipe temperature and pressure simulation assembly, an oil casing annular temperature and pressure simulation assembly, a formation confining pressure simulation assembly, a casing-cement sheath-formation combination preparation assembly, a blowby characteristic detection assembly, and a monitoring system. The oil pipe temperature and pressure simulation assembly may include an oil pipe, an oil pipe booster pump, and a heating and cooling cycle apparatus that are connected in sequence to form a loop. An outflow port of the oil pipe may be connected with an input end of the oil pipe booster pump. An output end of the heating and cooling cycle apparatus may be connected with an inflow port of the oil pipe. The connected oil pipe may be provided with an oil pipe valve that flows in a direction from the heating and cooling cycle apparatus to the oil pipe. An oil pipe temperature and pressure sensor may be arranged in the oil pipe. The oil casing annular temperature and pressure simulation assembly may include a casing and a booster pump. The casing may be coaxial with the oil pipe. An oil casing annular space may be formed between an inner surface of the casing and an outer surface of the oil pipe by sealing. The booster pump may be communicated with the oil casing annular space through an oil casing annular space pressure pipeline. The oil casing annular space pressure pipeline may be provided with an oil casing annular space valve. An oil casing annular space temperature and pressure sensor may be arranged in the oil casing annular space. The formation confining pressure simulation assembly may include a high-pressure cylinder, a heating sleeve, a high-pressure cylinder plug, and a formation confining pressure pipeline. The heating sleeve may be sleeved on an outer surface of the high-pressure cylinder. The high-pressure cylinder and the casing may be coaxially arranged. A closed space may be formed between an inner surface of the high-pressure cylinder and an outer surface of the casing through the high-pressure cylinder plug. One end of the formation confining pressure pipeline may be communicated with the closed space. Other end of the formation confining pressure pipeline may be connected with the booster pump. The formation confining pressure pipeline may be provided with a formation confining pressure valve. A formation temperature and pressure sensor may be arranged in the closed space. The casing-cement sheath-formation combination preparation assembly may be arranged in the closed space, including a formation rock, a sealing sleeve, an upper core plug, a lower core plug, and a combination fastener. The sealing sleeve may be sleeved on an outer surface of the formation rock. The formation rock and the casing may be arranged coaxially. A cement sheath space may be formed between an inner surface of the formation rock and an outer surface of the casing. A cement sheath may be formed by injecting a cement slurry system into the cement sheath space for solidification. A bottom of the upper core plug and a bottom of the lower core plug may be provided with pressure grooves. The pressure grooves may be communicated with the cement sheath space. The pressure groove of the lower core plug may be connected with the booster pump through a pressure detection inlet pipeline. The pressure detection inlet pipeline may be provided with a channeling pressure sensor and a channeling valve in turn. The pressure groove of the upper core plug may be connected with a blowby pressure sensor through a pressure detection outlet pipeline. The combination fastener may be configured to fix a whole formed by the cement sheath, the formation rock, the sealing sleeve, the upper core plug, and the lower core plug on the casing to prevent the whole from sliding on the casing. The blowby characteristic detection assembly may include the pressure detection inlet pipeline, the pressure detection outlet pipeline, the pressure grooves, the booster pump, the channeling pressure sensor, the blowby pressure sensor, the channeling valve, and the monitoring system for realizing real-time monitoring of a critical blowby pressure of the cement sheath. The monitoring system may be respectively connected with the oil pipe temperature and pressure sensor, the oil casing annular space temperature and pressure sensor, the formation temperature and pressure sensor, the channeling pressure sensor, and the blowby pressure sensor for realizing real-time monitoring and data curve recording of temperature and pressure conditions of each assembly.

One or more embodiments of the present disclosure provide an evaluation method for seal integrity of a wellbore in a full life cycle. The evaluation method may include the following operations. S1, Size parameters of the evaluation apparatus may be designed based on wellbore parameters and working conditions of a target well section of a target well to obtain the evaluation apparatus of the target well section, operation conditions of the target well in the full life cycle may be analyzed, and a temperature, a pressure and fluctuations of the temperature and pressure of an oil pipe, an oil casing annular space and a formation caused by each operation condition may be determined, a fluid composition, a gas-liquid multiphase flow state, and a transition condition of a critical state in the oil pipe and the oil casing annular space may be determined, and a formation pressure and fluctuation of the formation pressure under various operation conditions may be determined based on production operation well history data of the target well. S2: a pressure test on the evaluation apparatus may be carried out to determine that a temperature resistance performance, a pressure bearing performance and a sealing performance of the evaluation apparatus meet experimental requirements of the target well section, a temperature and pressure alternating, a fluid phase transition and experimental period parameter of each assembly of the evaluation apparatus may be determined. S3: based on actual cementing working condition of the target wellbore section, temperatures of the oil pipe, a casing and a formation rock may be controlled through a heating sleeve, and a steady-state heat transfer state of the oil pipe, the casing and the formation rock may be simulated under a cementing condition through adding wellbore working fluid to the oil pipe and the casing, an internal temperature and pressure of the oil pipe may be controlled through an oil pipe booster pump, a heating and cooling cycle apparatus, and an oil pipe temperature and pressure sensor, and a temperature and pressure of the oil casing annular space may be controlled through the a booster pump, an oil casing annular space temperature and pressure sensor, and an oil casing annular space valve, a temperature and pressure of the formation may be controlled through the heating sleeve, the booster pump, a formation temperature and pressure sensor, a formation confining pressure valve to stably maintain a balanced state of each assembly, a cement slurry system may be injected into the cement sheath space until the cement slurry system is solidified and a cementing operation period is completed, and a solidification of the casing-cement sheath-formation combination may be completed. S4: based on the production operation conditions determined in S1 and S2, the temperatures of the oil pipe, the casing and the formation rock may be controlled through the heating sleeve, a gas-liquid phase medium may be introduced into the oil pipe under the production operation condition, and an annular protective fluid or an wellbore working fluid may be introduced into the casing, and an alternating simulation of an internal temperature, a pressure, a fluid phase change, an vibration, a bulge and deformation state of the oil pipe may be controlled through the oil pipe booster pump, the heating and cooling cycle apparatus, the oil pipe temperature and pressure sensor, and an oil pipe valve, the alternate simulation of the temperature, the pressure, the fluid phase change, the vibration, the bulge and deformation state of the oil casing annular space may be controlled through the booster pump, the oil casing annular space temperature and pressure sensor, and the oil casing annular space valve, the alternating simulation of formation temperature and formation pressure and crustal stress around the wellbore may be controlled through the heating sleeve, the booster pump, the formation temperature and pressure sensor, the formation confining pressure valve, a data curve of each assembly may be recorded and controlled through the monitoring system until the production operation period is completed, and an alternating maintenance of the casing-cement sheath-formation combination may be completed. S5: at any time during a production process, a set pressure along a lower part of the casing-cement sheath-formation combination may be applied through a pressure detection inlet pipeline, the booster pump, a channeling pressure sensor, and a channeling valve, and a blowby pressure curve of a upper part of the casing-cement sheath-formation combination may be monitored in real time through a pressure detection outlet pipeline, a blowby pressure sensor, and the monitoring system to obtain a real-time blowby pressure curve of the casing-cement sheath-formation combination under corresponding production operation conditions after cementing is completed. S6: the S3-S5 may be repeated to obtain the blowby pressure curve of the casing-cement sheath-formation combination of the target well under various production operation conditions. S7: the blowby pressure curves of the casing-cement sheath-formation combination under various production operation conditions may be combined with a blowby pressure of the lower part of the casing-cement sheath-formation combination, a pressure of blowby to the upper part of the casing-cement sheath-formation combination, and the internal blowby channel situation, it may be analyzed and determined whether the cement slurry system injected in the S3 meets the seal integrity and critical blowby pressure requirements of each production operation condition of the target well in the full life cycle, in response to a determination that the cement slurry system meets the seal integrity and critical blowby pressure requirements, the cement slurry system, the cementing conditions, and the production operation conditions of the wellbore may meet the requirements of the seal integrity of the wellbore in the full life cycle, in response to a determination that the cement slurry system does not meet the seal integrity and critical blowby pressure requirements, optimizing design parameters of the seal integrity of the wellbore, and S1-S7 may be repeated until the critical blowby pressure of the cement sheath meets the requirements of the seal integrity of the wellbore in the full life cycle.

BRIEF DESCRIPTION OF THE DRAWINGS

The present disclosure may be further described by way of exemplary embodiments, which may be described in detail by means of the accompanying drawings. These embodiments are not limiting, and in these embodiments, the same numbers refer to the same structures, wherein.

DETAILED DESCRIPTION

In order to illustrate technical solutions of the embodiments of the present disclosure more clearly, the following briefly illustrates drawings in the illustration of the embodiments. Drawings in the following illustration are merely some examples or embodiments of the present disclosure. For those skilled in the art, the present disclosure may be applied to other similar scenarios in accordance with the drawings without creative works. Unless obviously obtained from the context or the context illustrates otherwise, the same number in the drawings refers to the same structure or operation.

It should be understood that "system", "apparatus", "unit", and/or "module" used herein are a method for distinguishing different components, elements, members, parts, or assemblies of different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "comprising" and "including" only prompt steps and elements that are explicitly identified, and these steps and elements do not constitute an exclusive list. Methods or apparatus may also include other steps or elements.

Flowcharts are used in the present disclosure to illustrate the operations performed by the system according to some embodiments of the present disclosure. It should be understood that the front or rear operations may not be necessarily performed exactly in order. On the contrary, each step may be performed in reverse or simultaneously. At the same time, other operations may also be added to the procedures, or a certain step or several steps may be removed from the procedures.

Figure 1:
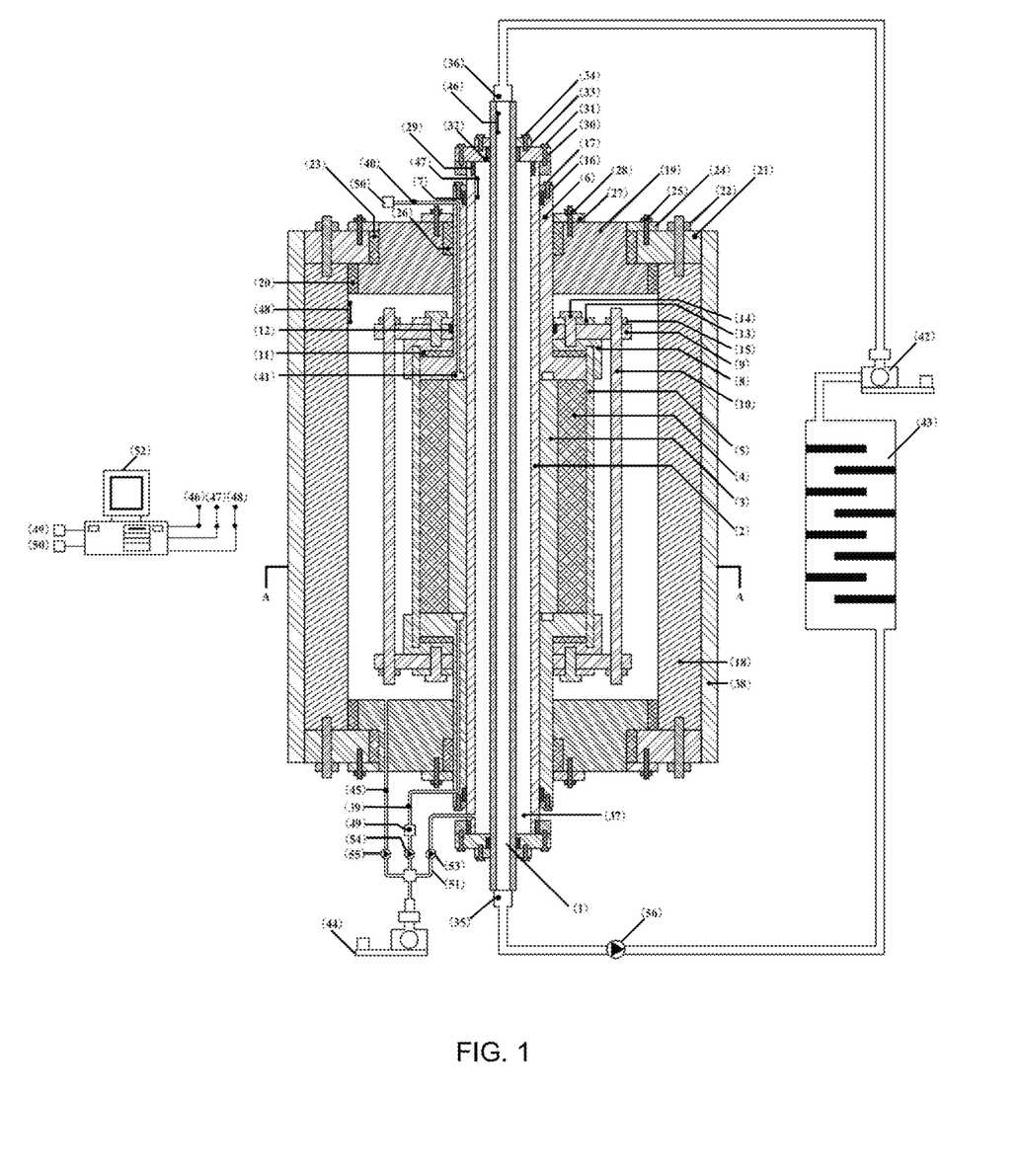
FIG. 1 is a schematic diagram illustrating a structure of the apparatus according to some embodiments of the present disclosure.
Figure 2:
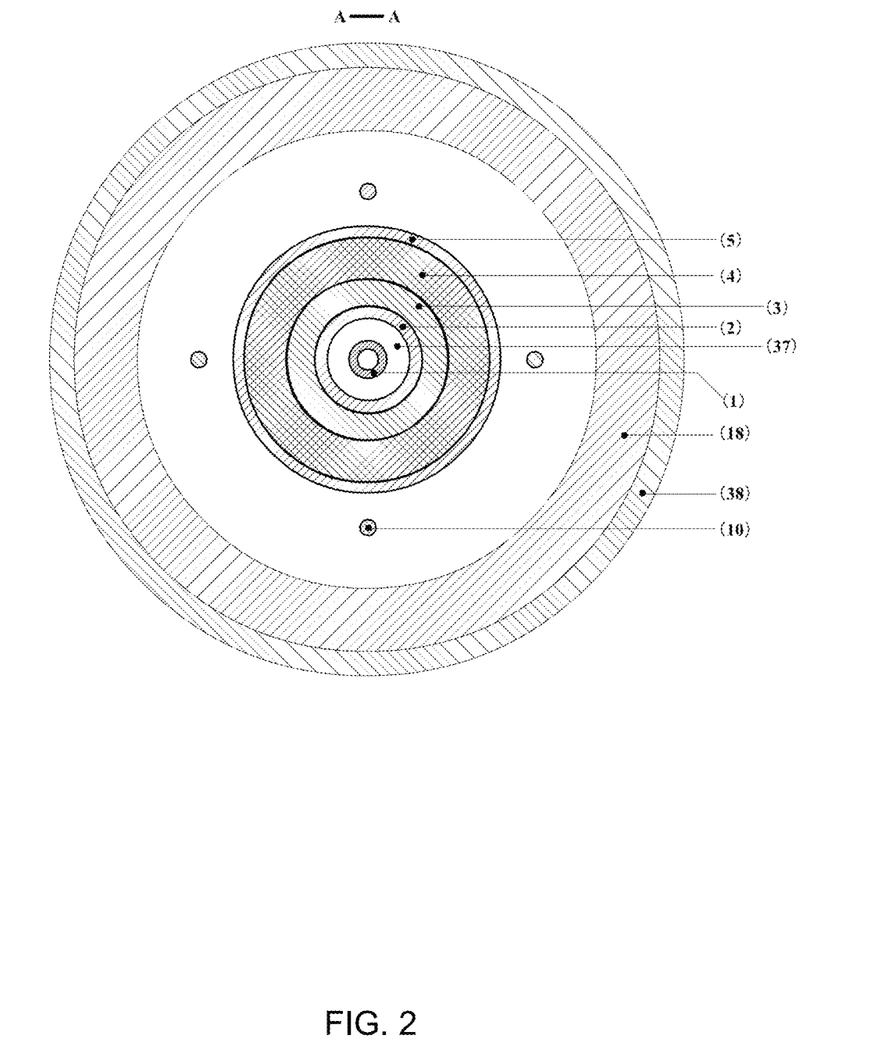
FIG. 2 is a schematic cross-sectional view of section A-A of FIG. 1 according to some embodiments of the present disclosure.

FIG. 1 is a schematic diagram illustrating a structure of the apparatus according to some embodiments of the present disclosure. FIG. 2 is a schematic cross-sectional view of section A-A of FIG. 1 according to some embodiments of the present disclosure.

As shown in FIG. 1 and FIG. 2, the present disclosure provides an evaluation apparatus for seal integrity of a wellbore in a full life cycle. The apparatus may include an oil pipe temperature and pressure simulation assembly, an oil casing annular temperature and pressure simulation assembly, a formation confining pressure simulation assembly, a casing-cement sheath-formation combination preparation assembly, a blowby characteristic detection assembly, and a monitoring system 52.

The oil pipe temperature and pressure simulation assembly may be configured to realize an alternating simulation of an internal temperature, a pressure, a fluid phase change, a vibration, a bulge, deformation, and other states of the oil pipe during the oil and gas well production operation. In some embodiments, the oil pipe temperature and pressure simulation assembly may include an oil pipe 1, an oil pipe booster pump 42, and a heating and cooling cycle apparatus 43 that are connected in sequence to form a loop.

The oil pipe 1 may refer to a pipeline for conveying fuel oil. The diameter and arrangement of the oil pipe 1 may be determined in various ways, such as experiments, simulations, or the like. In some embodiments, the oil pipe 1 may be provided with an oil pipe temperature and pressure sensor 46. The oil pipe temperature and pressure sensor 46 may refer to a sensor apparatus for monitoring the temperature and pressure in the oil pipe 1, which may be a sensor for integral measurement of temperature and pressure, or a separate temperature sensor and pressure sensor, which are not limited in the present disclosure.

The oil pipe booster pump 42 may refer to an apparatus for pressurizing the oil pipe to ensure the oil pipe conveying capacity. The oil pipe booster pump 42 may be of various types, which may be an air-type booster pump, a gas-liquid type booster pump, a chlorine-type booster pump, or the like.

The heating and cooling cycle apparatus 43 may refer to an apparatus that integrates heating and cooling, which may be configured to heat and cool the circulating fluid in the oil pipe 1.

In some embodiments, the outflow port 36 of oil pipe 1 may be connected with the input end of an oil pipe booster pump 42. An output end of the heating and cooling cycle apparatus 43 may be connected with an inflow port 35 of the oil pipe 1, and the connected oil pipe may be provided with an oil pipe valve 56 that flows in a direction from the heating and cooling cycle apparatus 43 to the oil pipe 1.

The oil pipe valve 56 may refer to an apparatus that is configured to control the oil pipe 1 to communicate with the oil pipe booster pump 42 and the heating and cooling cycle apparatus 43. When the oil pipe valve 56 is in the open state, the oil pipe 1 may be communicated with the oil pipe booster pump 42 and the heating and cooling cycle apparatus 43. At this time, the oil pipe booster pump 42 and the heating and cooling cycle apparatus 43 may respectively regulate the pressure and temperature in the oil pipe 1.

In some embodiments, the oil pipe temperature and pressure simulation assembly may pressurize and depressurize the circulation system based on the oil pipe booster pump 42 and the oil pipe valve 56, heat and cool the circulating fluid based on the heating and cooling cycle apparatus 43, and real-time monitor and record the oil pipe temperature and pressure curve based on the oil pipe temperature and pressure sensor 46 and the monitoring system 52. The oil pipe temperature and pressure simulation assembly may further simulate complex alternating load states such as temperature, pressure, fluid phase change, vibration, bulging, deformation, etc. in various production operation conditions of oil and gas wells, and test the critical blowby pressure of the casing-cement sheath-formation combination under the operation condition to evaluate the influence of oil pipe temperature and pressure fluctuations on the seal integrity of the combination during production operations. The circulation system may refer to a circuit composed of the oil pipe 1, the oil pipe booster pump 42, the heating and cooling cycle apparatus 43, and oil pipe valve 56. For more descriptions about the monitoring system 52, please refer to the relevant description below.

The oil casing annular temperature and pressure simulation assembly may be configured to realize an alternating simulation of an internal temperature, a pressure, a fluid phase change, a vibration, a bulge, deformation, and other states of the oil casing annular space during the oil and gas well production operation. In some embodiments, the oil casing annular temperature and pressure simulation assembly may include a casing 2 and a booster pump 44.

The casing 2 may refer to a pipeline arranged on an outer layer of the oil pipe 1 and coaxial with the oil pipe 1. The distance between the inner surface of the casing 2 and the outer surface of the oil pipe 1 may be determined based on various manners such as experiments and simulations.

The booster pump 44 may be an apparatus for pressurizing the space formed between the inner surface of the casing 2 and the outer surface of the oil pipe 1. The booster pump 44 may be of the same type as the oil pipe booster pump 42, such as an air-pump booster pump, a gas-liquid booster pump, or the like.

In some embodiments, the casing 2 may be coaxial with the oil pipe 1, and the oil casing annular space 37 may be formed between the inner surface of the casing 2 and the outer surface of the oil pipe 1 by sealing, the booster pump 44 may be communicated with the oil casing annular space 37 through an oil casing annular space pressure pipeline 51, the oil casing annular space pressure pipeline 51 may be provided with an oil casing annular space valve 53, and an oil casing annular space temperature and pressure sensor 47 may be arranged in the oil casing annular space 37.

The oil casing annular space 37 may refer to a sealed space formed between the inner surface of the casing 2 and the outer surface of the oil pipe 1.

The oil casing annular space pressure pipeline 51 may refer to the connection channel between the casing 2 and the booster pump 44 and the oil casing annular space valve 53.

The oil casing annular space valve 53 may be an apparatus that is configured to control the communication between the casing 2 and the booster pump 44. When the oil casing annular space valve 53 is in an open state, the casing 2 may be communicated with the booster pump 44, and the booster pump 44 may be configured to pressurize the casing 2.

The oil casing annular space temperature and pressure sensor 47 may refer to a sensor apparatus for monitoring the temperature and pressure in the oil casing annular space 37. Like the oil pipe temperature and pressure sensor 46, the oil casing annular space temperature and pressure sensor 47 may be a sensor for integral measure of temperature and pressure, or may be a separate temperature sensor and pressure sensor, which is not limited in the present disclosure.

In some embodiments, the oil casing annular temperature and pressure simulation assembly may simulate oil and gas wells to introduce gas-liquid fluid in the oil casing annular space 37, use the oil casing annular space pressure pipeline 51, the booster pump 44, and the oil casing annular space valve 53 to pressurize and depressurize the oil casing annular space 37, use the heating sleeve 38 to heat up and cool down the oil casing annular space 37, and use the oil casing annular space temperature and pressure sensor 47 and the monitoring system 52 to monitor and record the temperature and pressure curve of the oil casing annular space 37 in real time. The oil casing annular temperature and pressure simulation assembly may further simulate complex alternating load states of the casing 2 and the casing annular space 37 such as temperature, pressure, fluid phase change, vibration, bulging, deformation, etc., caused by various production operation conditions of oil and gas wells and the correlation effect of various components of the wellbore, and test the critical blowby pressure of the casing-cement sheath-formation combination under the production operation condition to evaluate the influence of the fluctuations of operation conditions of the oil pipe 1, the casing 2, oil casing annular space 37 caused by the production operations on the seal integrity of the combination. For more description about the heating sleeve 38, please refer to the relevant descriptions below.

The formation confining pressure simulation assembly may be configured to realize the alternating simulation of formation temperature, formation pressure around the wellbore, and non-uniform crustal stress near the wellbore. In some embodiments, the formation confining pressure simulation assembly may include a high-pressure cylinder 18, a heating sleeve 38, a high-pressure cylinder plug 19, and a formation confining pressure pipeline 45.

The high-pressure cylinder 18 may refer to a member that is coaxially arranged on the outer layer of the casing 2 and may be configured to withstand external pressure. The distance between the inner surface of the high-pressure cylinder 18 and the outer surface of the casing 2 may be determined based on experiments, simulations, or the like.

The heating sleeve 38 may be a member for temperature regulation. The heating sleeve 38 may be arranged on the outer surface of a certain component to directly heat the component or heat the space formed based on the component. For example, the heating sleeve 38 may be configured to heat the oil casing annular space 37, etc.

The high-pressure cylinder plug 19 may be a member for sealing the space between the inner surface of the high-pressure cylinder 18 and the outer surface of the sleeve 2. More descriptions of the high-pressure cylinder plug 19, reference may be found in the related descriptions below.

The formation confining pressure pipeline 45 may refer to a connection channel of the high-pressure cylinder plug 19, a booster pump 44 and a formation booster valve 55. The formation booster valve 55 may be an apparatus for controlling the communication between the high-pressure cylinder plug 19 and the booster pump 44. When the formation booster valve 55 is in an open state, the high-pressure cylinder plug 19 may be communicated with the booster pump 44. At this time, the booster pump 44 may be configured to pressurize the closed space formed between the inner surface of the high-pressure cylinder 18 and the outer surface of the casing 2.

In some embodiments, the heating sleeve 38 may be sleeved on an outer surface of the high-pressure cylinder 18, and the high-pressure cylinder 18 and the casing 2 may be coaxially arranged, and a closed space may be formed between an inner surface of the high-pressure cylinder 18 and an outer surface of the casing 2 through the high-pressure cylinder plug 19, one end of the formation confining pressure pipeline 45 may be communicated with the closed space, and other end of the formation confining pressure pipeline 45 may be connected with the booster pump 44, and the formation confining pressure pipeline 45 may be provided with a formation confining pressure valve 55, and a formation temperature and pressure sensor 48 may be arranged in the closed space.

The formation temperature and pressure sensor 48 may refer to a sensor apparatus for monitoring the temperature and pressure in the above-mentioned enclosed space. Like the above temperature and pressure sensor, the formation temperature and pressure sensor 48 may be a sensor with integral measure of temperature and pressure, or may be a separate temperature sensor and pressure sensor, which is not limited in the present disclosure.

In some embodiments, the formation confining pressure simulation assembly may add gas-liquid fluid to simulate the formation rock around the well, use the heating sleeve 38 to heat up and cool down the closed system, use the booster pump 44, the formation confining pressure pipeline 45, and the formation confining pressure valve 55 to pressurize and depressurize the closed system, and use the formation temperature and pressure sensor 48 and the monitoring system 52 to monitor and record the temperature and pressure curve of the closed system in real time. The formation confining pressure simulation assembly may further simulate the complex alternating load state of non-uniform crustal stress of the formation around the wellbore caused by various production operation conditions of oil and gas wells and the correlation effects of temperature, pressure and crustal stress around the wellbore, and test the critical blowby pressure of the casing-cement sheath formation combination under the production operation conditions to evaluate the influence of fluctuation of working conditions of pipe 1, casing 2, annular space and formation around the well caused by the production operations on the seal integrity of the combination. The closed system may refer to a system closed by components such as the high-pressure cylinder 18 and the high-pressure cylinder plug 19.

The casing-cement sheath-formation combination preparation assembly may be configured to prepare a casing-cement sheath-formation combination. In some embodiments, the casing-cement sheath-formation combination preparation assembly may be disposed in the above-mentioned closed space, which may include a formation rock 4, a sealing sleeve 5, an upper core plug 6, a lower core plug and a combination fastener.

The formation rock 4 may refer to the formation rock that is arranged on the outer surface of the casing 2 and coaxial with the casing 2 in a closed space. The distance between the inner surface of the formation rock 4 and the outer surface of the casing 2 may be determined based on experiments, simulations, or the like.

The sealing sleeve 5 may be a member for sealing the outer surface of the formation rock 4. In some embodiments, the sealing sleeve 5 may be a copper sleeve and may be made of red copper. It should be noted that, in addition to the red copper sleeve used as the sealing sleeve 5 in the embodiment, other materials that withstand pressure and seal the outer surface of the formation rock 4 may also be used as the sealing sleeve 5, which is not limited in the present disclosure.

The formation rock 4 may be a pore structure, and in the indoor evaluation apparatus, the size of the formation rock 4 may be limited, and when detecting the blowby pressure of the cement sheath, the pressure may spread from the formation rock 4 to the closed space, making the blowby pressure test inaccurate. In some embodiments of the present disclosure, the occurrence of this situation may be prevented by covering the outer surface of the formation rock 4 with the sealing sleeve 5, so that the test result is closer to the result of the actual formation, and the accuracy of the evaluation result is improved.

The upper core plug 6 and the lower core plug may be members for sealing the upper and lower end faces of the formation rock 4, respectively. In some embodiments, the upper core plug 6 may have the same structure as the lower core plug, and may be symmetrically arranged on both ends of the formation rock 4.

The combination fastener may be a member for fixing the whole formed by the cement sheath 3, the formation rock 4, the sealing sleeve 5, the upper core plug 6 and the lower core plug on the casing 2. More descriptions of the cement sheath 3 and the combination fastener, reference may be found in the related descriptions below.

In some embodiments of the present disclosure, the above-mentioned whole is fixed by the combination fastener, which may effectively prevent the whole from sliding on the casing.

In some embodiments, the formation rock 4 and the casing 2 may be arranged coaxially, and a cement sheath space may be formed between an inner surface of the formation rock 4 and an outer surface of the casing 2, a cement sheath 3 may be formed by injecting a cement slurry system into the cement sheath space for solidification, a bottom of the upper core plug 6 and a bottom of the lower core plug may be provided with pressure grooves 41, and the pressure grooves 41 may be communicated with the cement sheath space, and the pressure groove 41 of the lower core plug may be connected with the booster pump 44 through a pressure detection inlet pipeline 39, and the pressure detection inlet pipeline 39 may be provided with a channeling pressure sensor 49 and a channeling valve 54 in turn. The pressure groove 41 of the upper core plug 6 may be connected with a blowby pressure sensor 50 through a pressure detection outlet pipeline 40.

The pressure groove 41 may be a notch for pressurizing the cement sheath space. In some embodiments, in order to prevent the cement slurry from clogging the pressure groove 41 of the lower core plug when the cement slurry system is poured, in the evaluation apparatus, the pressure groove 41 of the lower core plug is provided with an impermeable cloth or a filter screen, etc., through which gas can pass but the cement slurry cannot pass for clogging. More descriptions of the cement slurry system, reference may be found in the related descriptions below.

The pressure detection inlet pipeline 39 may refer to a connection channel between the lower core plug and the channeling pressure sensor 49, the channeling valve 54 and the booster pump. The channeling pressure sensor 49 may be a pressure sensor that is configured to channeling detection. The channeling valve 54 may be an apparatus for controlling the communication between the booster pump 44 and the channeling pressure sensor 49 and the lower core plug.

The pressure detection outlet pipeline 40 may refer to a connection channel between the upper core plug 6 and the blowby pressure sensor 50. The blowby pressure sensor 50 may be a pressure sensor that is configured to blowby monitoring.

In some embodiments, after the casing-cement sheath-formation combination preparation assembly is assembled as a whole, the pressure of the casing during the cementing operation may be simulated by applying pressure to the oil casing annular space 37, and the temperature of the formation during the cementing operation may be simulated by raising the temperature of the heating sleeve 38, the formation confining pressure around the well may be simulated by applying pressure to the inside of the high-pressure cylinder 18, the solidification process of cement slurry system may be completed under simulated cementing working conditions, and the canned cement slurry system solidifies to form a cement sheath 3, which can finely simulate the wellbore cementing operation conditions and prepare a casing-cement sheath-formation combination. After the casing-cement sheath-formation combination preparation assembly is assembled as a whole, the cyclic alternating operation conditions of the oil pipe during the production operation may be simulated by applying alternating temperature and pressure to the oil pipe 1 through the fluid inlet 35 of the oil pipe 1, the alternating operation conditions of the casing and the annular space during the production operation may be simulated by applying alternating temperature and pressure to the oil casing annular space 37 through the oil casing annular space pressure line 51 and the oil casing annular space valve 53, the alternating temperatures of the oil pipe 1, the casing 2 and the formation during the production operation may be simulated through the heating and cooling of the heating sleeve 38, the alternating operation condition of the formation confining pressure around the well during the production operation may be simulated by applying the alternating temperature and pressure to the interior of the high-pressure cylinder 18 through the formation confining pressure pipeline 45 and the formation confining pressure valve 55, the temperature and pressure alternating curve of the production operation conditions of the full life cycle may be recorded in real time through the monitoring system 52, and the damage effect of various production operation conditions in the full life cycle on the casing-cement sheath-formation combination may be simulated in turn based on the production operation sequence or design scheme to complete the maintenance of the casing-cement sheath-formation combination under various production operation conditions.

The blowby characteristic detection assembly may be configured to realize real-time monitoring of the critical blowby pressure of the cement sheath. The critical blowby pressure of the cement sheath may refer to the minimum pressure that the casing-cement sheath-formation combination is subjected to when the blowby occurs.

In some embodiments, the blowby characteristic detection assembly may include, but is not limited to, a channeling pressure sensor 49, a blowby pressure sensor 50, or the like.

In some embodiments, the blowby characteristic detection assembly may pressurize and depressurize the blowby channel through the booster pump 44 and the channeling valve 54, monitor and record the channeling pressure curve in real time through the channeling pressure sensor 49 and the monitoring system 52, and monitor and record the blowby pressure curve in real time through the blowby pressure sensor 50 and the monitoring system 52 to test the critical blowby pressure of the casing-cement sheath-formation combination during the entire production operation to evaluate the seal integrity of the casing-cement sheath-formation assembly throughout the full life cycle.

The monitoring system 52 may be configured to monitor the temperature and pressure conditions in each component, and record data curves. In some embodiments, the monitoring system 52 may be a terminal device, for example, a desktop computer, a tablet computer, a notebook computer and other intelligent electronic device that may realize data processing and data communication.

In some embodiments, the monitoring system 52 may be connected with the oil pipe temperature and pressure sensor 46, the oil casing annular space temperature and pressure sensor 47, the formation temperature and pressure sensor 48, the channeling pressure sensor 49, and the blowby pressure sensor 50, respectively.

In some embodiments, the monitoring system 52 may monitor and control experimental parameters such as temperature and pressure of each component in real time and accurately simulate operation conditions of oil and gas well cementing and various production operations to accurately and reliably measure the critical blowby pressure of the casing-cement sheath-formation combination under this working conditions.

In some embodiments, the casing 2 and the oil pipe 1, the casing 2 and the high-pressure cylinder plug 19, the high-pressure cylinder plug 19 and the high-pressure cylinder 18, the upper core plug 6 and the casing 2, and the lower core plug and the casing 2 may be all connected by flanges and bolts. Further, a sealing assembly may be provided between the components connected by the flange.

The sealing assembly may refer to a member having sealing properties, such as a rubber sealing ring, or the like. In some embodiments, the sealing assembly may include a casing flange sealing assembly 29, a casing core plug sealing assembly 7, a high-pressure cylinder plug core plug sealing assembly 26, a high-pressure cylinder plug sealing assembly 20, a high-pressure cylinder plug flange sealing assembly 23, and other assembly. More descriptions of the above-mentioned sealing assembly, reference may be found in the related descriptions blow. It should be noted that, in addition to the rubber sealing ring, other materials or structures that may enhance the sealing performance may also be used as the sealing assembly, which is not limited in the present disclosure.

In some specific embodiments, the top of the casing 2 and the bottom of the casing 2 may be respectively connected with the upper and lower parts of the oil pipe 1 through a casing flange 30 and a casing flange bolt 31. A casing flange sealing assembly 29 may be arranged between the casing flange 30 and the casing 2. In addition, in order to further seal the casing 2 and the casing flange 30, optionally, the top of the casing flange 30 may be further provided with a casing flange sealing flange 33 and a casing flange sealing flange bolt 34.

The casing flange 30 and the casing flange bolt 31 may be respectively the flange and the bolt that are configured to fix the connection between the casing 2 and the oil pipe 1. The casing flange sealing assembly 29 may be a member for sealing the connection of the casing flange 30 and the casing 2. The casing flange sealing flange 33 and the casing flange sealing flange bolt 34 may be flanges and bolts for sealing the casing flange 30 and the casing flange bolt 31 respectively.

In some specific embodiments, the upper core plug 6 and the lower core plug may be all connected with the casing 2 by the casing core plug sealing flange 16 and the casing core plug sealing flange bolt 17, and a casing core plug sealing assembly 7 may be arranged between the casing core plug sealing flange 16 and the casing 2.

The casing core plug sealing flange 16 and the casing core plug sealing flange bolt 17 may be respectively the flange and the bolt that are configured to fix connection of the casing 2 with upper core plug 6 and lower core plug. The casing core plug sealing assembly 7 may be a member for sealing the connection between the casing core plug sealing flange 16 and the casing 2.

In some specific embodiments, the high-pressure cylinder plug 19 may include an upper high-pressure cylinder plug and a lower high-pressure cylinder plug. The upper high-pressure cylinder plug and the upper core plug 6, and the lower high-pressure cylinder plug and the lower core plug may be both connected with a high-pressure cylinder plug core plug sealing flange 27 and a high-pressure cylinder plug core plug sealing bolt 28, and a high-pressure cylinder plug core plug sealing assembly 26 may be arranged between the high-pressure cylinder plug 19 and the core plug.

The upper high-pressure cylinder plug and the lower high-pressure cylinder plug may refer to the high-pressure plugs that are respectively arranged on the upper and lower ends of the apparatus. The high-pressure cylinder plug core plug sealing flange 27 and the high-pressure cylinder plug core plug sealing bolt 28 may be respectively flanges and bolts used for fixing the connection between the high-pressure cylinder plug 19 and the core plug. The high-pressure cylinder plug core plug sealing assembly 26 may be a member for sealing the connection between the high-pressure cylinder plug 19 and the core plug.

In some specific embodiments, the high-pressure cylinder plug 19 and the high-pressure cylinder 18 may be connected by the high-pressure cylinder plug flange 21 and the high-pressure cylinder plug bolt 22, and a high-pressure cylinder plug sealing assembly 20 may be arranged between the high-pressure cylinder plug 19 and the high-pressure cylinder 18. In addition, in order to further seal the high-pressure cylinder plug 19 and the high-pressure cylinder plug flange 21, optionally, the top of the high-pressure cylinder plug flange 21 may be provided with a high-pressure cylinder plug flange sealing flange 24 and a high-pressure cylinder plug flange sealing flange bolt 25, and a high-pressure cylinder plug flange sealing assembly 23 may be also provided between the high-pressure cylinder plug flange sealing flange 24 and the high-pressure cylinder plug 19.

The high-pressure cylinder plug flange 21 and the high-pressure cylinder plug bolt 22 may be respectively flanges and bolts for the fixed connection of the high-pressure cylinder plug 19 and the high-pressure cylinder 18. The high-pressure cylinder plug sealing assembly 20 may be a member configured to seal the connection between the high-pressure cylinder plug 19 and the high-pressure cylinder 18. The high-pressure cylinder plug flange sealing flange 24 and the high-pressure cylinder plug flange sealing flange bolt 25 may be respectively flanges and bolts that are configured to further seal the high-pressure cylinder plug 19 and the high-pressure cylinder plug flange 21. The high-pressure cylinder plug flange sealing assembly 23 may be a member configured to further seal the connection between the high-pressure cylinder plug flange sealing flange 24 and the high-pressure cylinder plug 19.

In some specific embodiments, the combination fastener may include a sealing sleeve fixing flange 8, a combination tensioning flange 9, a tie rod 10, a sealing sleeve core plug sealing assembly 11, a tensioning flange core plug sealing assembly 12, a tensioning flange sealing flange 13, a tensioning flange sealing flange bolt 14, and a combination tensioning flange bolt 15.

The sealing sleeve fixing flange 8 may be a flange for fixing the sealing sleeve 5. The combination tensioning flange 9 may be a flange for tensioning and fixing the combination. The tie rod 10 may be a rod for tensioning the combination, one end of the tie rod 10 passes through the combination tensioning flange 9 at the top of the whole and is fastened by the combination tensioning flange bolt 15, and the other end of the tie rod 10 passes through the combination tensioning flange 9 at the bottom of the whole and is fastened by the combination tensioning flange bolt 15, and other end of the tie rod 10 passes through the combination tensioning flange 9 at bottom of the whole and is fastened by the combination tensioning flange bolt 15. The combination tensioning flange bolt 15 may be a bolt for tensioning and fixing the combination. The sealing sleeve core plug sealing assembly 11 may be a sealing assembly for sealing the connection between the sealing sleeve 5 and the core plug. The tensioning flange core plug sealing assembly 12 may be a sealing assembly for sealing the connection between the combination tensioning flange 9 and the core plug. The tensioning flange sealing flange 13 and the tensioning flange sealing flange bolt 14 may be a respectively flange and a bolt that are configured to further seal the combination tensioning flange 9.

In some embodiments of the present disclosure, by using flanges and bolts to connect a plurality of components, and arranging a sealing assembly between the components connected by the flanges, the tightness of the evaluation apparatus for seal integrity of the wellbore in the full life cycle may be effectively guaranteed, so as to ensure the accuracy of the test results of the simulation.

In some embodiments, the evaluation apparatus for seal integrity of the wellbore in the full life cycle may further include a heating apparatus (not shown in figure). The heating apparatus may be an oil pipe heater, etc., which is not limited in the present disclosure.

In some embodiments, the heating apparatus may be arranged in the oil pipe 1 to simulate that the oil pipe 1, the casing 2 and the formation rock 4 are in an unsteady heat transfer state. The unsteady heat transfer state may refer to a heat conduction process in which the temperature of the object changes with time, such as the heating or cooling process of the oil pipe 1, or the like.

In some embodiments, the present disclosure may provide an evaluation method for seal integrity of a wellbore in a full life cycle, the method may include the following operations.

S1: designing an evaluation apparatus for seal integrity of a wellbore in a full life cycle with the size parameters of the oil pipe 1, the casing 2, and cement sheath 3 consistent with or similar to the target well section based on the wellbore parameters and working conditions of deep and ultra-deep wells, high-temperature and high-pressure wells, injection-production wells, and geothermal wells, analyzing the operation conditions experienced by the well in the full life cycle, selecting one or more operation conditions with high temperature and pressure and large alternating load, determining a temperature, a pressure and fluctuations of the temperature and pressure of the oil pipe 1, an oil casing annular space 37 and a formation caused by each operation condition, determining a fluid composition, a gas-liquid multiphase flow state, and a transition condition of a critical state in the oil pipe 1 and the oil casing annular space 37, and determining a formation pressure and fluctuation of the formation pressure under various operation conditions based on the oil and gas well production operation well history data.

The target well section may refer to a well section that needs to be studied, such as a certain section of a deep well and an ultra-deep well. The wellbore parameters may refer to parameters related to the wellbore, such as the length, diameter, etc. of the wellbore. The working condition may refer to the environmental condition of the environment where the wellbore is located, such as ambient temperature and humidity. The oil and gas well production operation well history data may refer to a collection of data of the oil and gas well in the past production operation process. The operation condition may refer to an environmental condition of oil and gas wells during production operation, such as temperature, pressure, etc. during operation.

S2: carrying out a pressure test on the evaluation apparatus to determine that the temperature resistance preformation, pressure bearing performance, and a sealing performance of the evaluation apparatus meet the experimental requirements of the target well section, determining a temperature and pressure alternating, a fluid phase transition and experiment of period parameter of each assembly of the evaluation apparatus.

In some embodiments, the pressure test may be performed on the oil pipe temperature and pressure simulation assembly, the casing annulus temperature and pressure simulation assembly, the formation confining pressure simulation assembly, and the blowby characteristic detection assembly to determine that the temperature resistance preformation, the pressure bearing performance, and the sealing performance of the evaluation apparatus meet the experimental requirements of the target well section, and the experimental condition parameters of each assembly such as temperature and pressure alternating, fluid phase transition and experimental period based on the wellbore cementing condition, operation condition, and the performance of the cement slurry system.

The wellbore cementing condition may refer to an environmental condition when the wellbore is cemented. The performance of the cement slurry system may refer to the performance related to the cement slurry system, such as anti-leakage performance, anti-gas channeling performance, or the like. The cement slurry system may refer to the working fluid system used in cementing, such as low density and high strength system, polyvinyl alcohol system, etc.

S3: based on the actual cementing working condition of target well section, controlling temperatures of the oil pipe 1, a casing 2 and a formation rock 4 through a heating sleeve 38, and simulating a steady-state heat transfer state of the oil pipe 1, the casing 2 and the formation rock 4 under a cementing condition through adding wellbore working fluid to the oil pipe 1 and the casing 2, controlling an internal temperature and pressure of the oil pipe 1 through an oil pipe booster pump 42, a heating and cooling cycle apparatus 43, and an oil pipe temperature and pressure sensor 46, and controlling a temperature and pressure of the oil casting annular space 37 through a booster pump 44, an oil casing annular space temperature and pressure sensor 47, and an oil casing annular space valve 53, controlling a temperature and pressure of the formation through the heating sleeve 38, the booster pump 44, a formation temperature and pressure sensor 48, a formation confining pressure valve 55 to stably maintain a balanced state of each assembly, injecting a cement slurry system into the cement sheath space until the cement slurry system is solidified and a cementing operation period is completed, and completing a solidification of the casing-cement sheath-formation combination.

The actual cementing working condition may refer to the working condition in the actual cementing operation process. The wellbore working fluid may refer to a type of fluid used in oil and gas well drilling engineering. The steady-state heat transfer state may mean that the temperature of each point in the heat transfer system only varies with location, but not with time.

In some embodiments, before using the wellbore cementing working conditions determined in the S2 to complete the solidification of the casing-cement sheath-formation combination, the evaluation apparatus needs to be assembled. Specifically, the assembling process of the evaluation apparatus may include the following operations.

S31: assembling the casing-cement sheath-formation combination preparation assembly. First, the casing 2 may be penetrated into the formation rock 4, the lower core plug, the casing core plug sealing assembly 7, the sealing sleeve core plug sealing assembly 11 may be installed, the cementing slurry system may be prepared, and the cementing slurry system may be gently poured into the annular space formed by the casing 2 and the formation rock 4. Then, the upper core plug 6, the casing core plug sealing assembly 7, the sealing sleeve core plug sealing assembly 11 may be installed, and the sealing sleeve 5 may be tightly wrapped in the outer layer of the formation rock 4, and the axial direction of the sealing sleeve 5 may be tightened to avoid gap and deformation. Finally, the sealing sleeve fixing flange 8, the combination tensioning flange 9, the tie rod 10, the tensioning flange core plug sealing assembly 12, the tensioning flange sealing flange 13, the tensioning flange sealing flange bolt 14 and a combination tensioning flange bolt 15 may be installed to complete the canning of the cement slurry system and the assembly of the casing cement sheath formation assembly preparation assembly.

S32: assembling the formation confining pressure simulation assembly. First, the high-pressure cylinder 18 may be sheathed outside the casing-cement sheath-formation combination preparation assembly. Then, a casing core plug sealing flange 16, a casing core plug sealing flange bolt 17, a high-pressure cylinder plug 19, a high-pressure cylinder plug sealing assembly 20, a high-pressure cylinder plug flange 21, a high-pressure cylinder plug flange bolt 22, a high-pressure cylinder plug flange sealing assembly 23, a high-pressure cylinder plug flange sealing flange 24, a high-pressure cylinder plug flange sealing flange bolt 25, a high-pressure cylinder plug core plug sealing assembly 26, a high-pressure cylinder plug core plug sealing flange 27, a high-pressure cylinder plug core plug sealing bolt 28, a heating sleeve 38, a booster pump 44, a formation confining pressure pipeline 45, a formation temperature and pressure sensor 48, a formation confining pressure valve 55 may be installed in sequence to form a formation confining pressure sealing system, that is, the assembly of the formation confining pressure simulation assembly is completed.

S33: assembling the oil casing annular temperature and pressure simulation assembly. First, the oil pipe 1 may be inserted into the casing 2. Then, a casing sealing assembly 29, a casing flange 30, a casing flange bolt 31, a casing flange sealing assembly 32, a casing flange sealing flange 33, a casing flange sealing flange bolt 34, an oil casing annular space temperature and pressure sensor 47, an oil casing annular space pressure pipeline 51, an oil casing annular space valve 53 may be installed in sequence to form a closed system of the oil casing annular space, that is, the assembly of the oil casing annular space temperature and pressure simulation assembly is completed.

S34: assembling the oil pipe temperature and pressure simulation assembly. First, the oil pipe temperature and pressure sensor 46 may be installed inside the oil pipe 1. Then, the fluid inlet 35 of the oil pipe 1 and the fluid outlet 36 of the oil pipe 1 may be connected with the oil pipe booster pump 42, the heating and cooling cycle apparatus 43, and the oil pipe valve 56 through an adapter to form a closed system of the oil pipe, that is, the assembly of the oil pipe temperature and pressure simulation assembly is completed.

S35: assembling the blowby characteristic detection assembly. First, the booster pump 44, the channeling pressure sensor 49, and the channeling valve 54 may be connected with the pressure detection inlet line 39. Then, the blowby pressure sensor 50 may be connected with the pressure detection outlet pipeline 40, and the monitoring system 52 may be connected with the channeling pressure sensor 49 and the blowby pressure sensor 50 to form a circulation loop for monitoring the blowby pressure, that is, the assembly of the blowby characteristic detection assembly is completed.

S36: connecting the monitoring system 52. In addition to the connection of the channeling pressure sensor 49 and the connection of the blowby pressure sensor 50 with the monitoring system 52 in S35, the oil pipe temperature and pressure sensor 46, the oil casing annular space temperature and pressure sensor 47, and the formation temperature and pressure sensor 48 may be further connected with the monitoring system 52 respectively to meet the requirements of cementing and production operation conditions for the function of real-time monitoring and data curve recording of the temperature and pressure conditions of each assembly, that is, the connection of the monitoring system 52 is completed.

S4: based on the production operation conditions determined in S1 and S2, controlling the temperatures of the oil pipe 1, the casing 2, and the formation rock 4 through the heating sleeve 38, introducing a gas-liquid phase medium into the oil pipe 1 under the production operation condition, and introducing an annular protective fluid or an wellbore working fluid into the casing 2, and controlling an alternating simulation of an internal temperature, a pressure, a fluid phase change, an vibration, a bulge and deformation state of the oil pipe 1 through the oil pipe booster pump 42, the heating and cooling cycle apparatus 43, the oil pipe temperature and pressure sensor 46, and an oil pipe valve 56; controlling the alternate simulation of the temperature, the pressure, the fluid phase change, the vibration, the bulge and deformation state of the oil casing annular space 37 through the booster pump 44, the oil casing annular space temperature and pressure sensor 47, and the oil casing annular space valve 53; controlling the alternating simulation of formation temperature and formation pressure and crustal stress around the wellbore through the heating sleeve 38, the booster pump 44, the formation temperature and pressure sensor 48, the formation confining pressure valve 55; recording and controlling a data curve of each assembly through the monitoring system 52 until the production operation cycle is completed, completing an alternating maintenance of the casing-cement sheath-formation combination.

The gas-liquid phase medium may be a mixed medium of a two-phase of gas and liquid. The annular protective fluid may be a fluid filled between the oil pipe 1 and the casing 2.

In some embodiments, when evaluating a thermal recovery well, a geothermal well or a high temperature and high pressure well as a target well, when the oil pipe 1 is heated based on the above operations, a heating apparatus may be inserted in the oil pipe 1 to simulate the unsteady heat transfer state of the oil pipe 1, the casing 2 and the formation rock 4.

S5: at any time during a production operation process, applying a set pressure along a lower part of the casing-cement sheath-formation combination through a pressure detection inlet pipeline 39, the booster pump 44, a channeling pressure sensor 49, and a channeling valve 54, and monitoring a blowby pressure curve of a upper part of the casing-cement sheath-formation combination in real time through a pressure detection outlet pipeline 40, a blowby pressure sensor 50, and the monitoring system 52 to obtain a real-time blowby pressure curve of the casing-cement sheath-formation combination under corresponding production operation conditions after cementing is completed.

S6: repeating the S3-S5 to obtain the blowby pressure curve of casing-cement sheath-formation combination of the target well under various production operation conditions.

S7: combining the blowby pressure curve of the casing-cement sheath-formation combination under various production operation conditions with a channeling pressure of the lower part of the casing-cement sheath-formation combination, a pressure of blowby to the upper part of the casing-cement sheath-formation combination, and the internal blowby channel situation, analyzing and determining whether the cement slurry system injected in the S3 meets the seal integrity and critical blowby pressure requirements of the target well of each production operation condition in the full life cycle.

In response to a determination that the cement slurry system meets the seal integrity and critical blowby pressure requirements, the cement slurry system, the cementing conditions, and the production operation conditions meeting the requirements of the seal integrity of the wellbore in the full life cycle.

In response to a determination that the cement slurry system does not meet the seal integrity and critical blowby pressure requirements, optimizing design parameters of the seal integrity of the wellbore, and repeating S1-S7 until the critical blowby pressure of the cement sheath meets the requirements of the seal integrity of the wellbore in the full life cycle.

In some embodiments, in the S7, when the cement slurry system does not meet the seal integrity and critical blowby pressure requirements, the design parameters of seal integrity of the wellbores may be optimized by any feasible scheme.

In some embodiments, the design parameters of seal integrity of the wellbore be optimized may include the following operations. Multiple sets of first candidate optimization parameter combinations may be generated. At least one set of second candidate optimization parameter combination may be determined based on the multiple sets of first candidate optimization parameter combinations. The design parameters of seal integrity of the wellbores may be optimized based on each set of the multiple sets of the second candidate optimization parameter combinations, and S1-S7 may be repeated until the critical blowby pressure of the cement sheath meets the requirements of the seal integrity of the wellbore in the full life cycle.

In some embodiments, multiple sets of first candidate optimization parameter combinations be generated, that is, an initial population be generated, the initial population is composed of several individuals, and each individual may refer to a first candidate optimization parameter combination. The first candidate optimization parameter combination may refer to a candidate parameter combination related to the requirements of the seal integrity of the wellbore. Parameters combinations related to requirements of the seal integrity of the wellbore may be coded in various ways to obtain individual code. For example, the individual code may include one or more combinations of slurry system parameters, cementing parameters, production characteristics, or the like. The cement slurry system parameter may include a selection of the system (e.g., polyvinyl alcohol system, latex system, etc.), a selection of constituent materials (e.g., reinforcing agent, fluid loss agent, etc.), and a proportion of each material, etc. The cementing parameter may include a selection of cementing process (e.g., liner cementing, inner pipe cementing, conventional cementing, etc.), a casing parameter (e.g., casing material, a pore diameter, and wall thickness, etc.), a selection of the drilling fluid, etc. The production characteristics may include a type of production operation conditions (e.g., production operations such as oil recovery or water injection after cementing is completed), a production operation parameter, etc. In some embodiments, the individual code may also include other related features, which are not limited here.

In some embodiments, multiple sets of the first candidate optimization parameter combinations may be iteratively updated, and at least one second candidate optimization parameter combination may be determined from the iteratively updated first candidate optimization parameter combinations, which may include performing multiple rounds of iterative update on the first candidate optimization parameter combination until the preset condition is satisfied, and determining the second candidate optimization parameter combination.

In some embodiments, at least one round of the multiple rounds of iterative update may include performing a transformation on the selected first candidate optimization parameter combination to generate a new first candidate optimization parameter combination, and adding the new first candidate optimization parameter combination to the population of the current round of iterative update. The transformation may include crossover, mutation, duplication, etc.

In some embodiments, the first candidate optimization parameter combination may be selected based on the evaluation value of the first candidate optimization parameter combination in the initial population. The selected first candidate optimization parameter combination may be transformed. For example, a crossover operation may be performed on any two selected first candidate optimization parameter combinations to obtain two sets of new first candidate optimization parameter combinations. For example, the values of parameters of the same type (e.g., cementing parameters) in two first candidate optimization parameter combinations may be exchanged. For another example, a mutation operation may be performed on the selected first candidate optimization parameter to obtain the new first candidate optimization parameter. For example, a certain parameter (e.g., cementing parameter) in a certain combination may be increased or decreased.

In some embodiments, after iterating preset times, the first candidate optimization parameter combination that meets the preset condition may be used as the second candidate optimization parameter combination. The preset condition may include that the evaluation value is greater than a threshold value or a maximum value, or the like. In some embodiments, the second candidate optimization parameter combination may include one or more optimization parameter combinations. In some embodiments, the preset times of iterations may be 100-1000, and under the condition that sufficient iterative calculation is ensured, better optimization results may be obtained quickly, and the calculation process may be accelerated.

The evaluation value may be determined by a model. In specific implementation, the individual code of the first candidate optimization parameter combination may be directly input into the evaluation value determination model, and the corresponding evaluation value may be output. More descriptions of the evaluation value determination model, reference may be found in the related descriptions below, which may not be repeated here.

As an example, in a certain round of iterations, a preset number of first candidate optimization parameter combinations may be eliminated based on the evaluation value. For example, the evaluation values of the multiple first candidate optimization parameter combinations may be sorted in descending order, and then the first candidate optimization parameter combinations whose evaluation value ranks are lower than the preset rank threshold may be eliminated, and the remaining top N first candidate optimization parameter combinations remain in the population for the next round of iterative update. After multiple rounds of iterations until the first candidate optimization parameter combination that meets the preset condition is obtained, the second candidate optimization parameter combination is obtained.

The evaluation value may indicate a feasibility of evaluating the optimization parameters. An evaluation value may be positively correlated with the feasibility of the optimization parameters. That is, the higher the feasibility of the optimization parameter is, the larger the evaluation value of optimization parameter is.

In some embodiments, the evaluation value determination model may be a machine learning model. In some embodiments, the evaluation value determination model may include a pressure determination layer and an evaluation value determination layer, and the pressure determination layer and the evaluation value determination layer may be a model obtained by a convolutional neural network or a deep neural network or a combination thereof.

In some embodiments, an input of the pressure determination layer may include the individual code and geological (environmental) parameters (including, but not limited to, a density, a porosity, a permeability coefficient, a hydraulic conductivity, a pressure conduction coefficient, etc.) of the first candidate optimization parameter combination, the output of the pressure determination layer may include the blowby pressure curve of the formation combination casing-cement sheath-formation combination, the channeling pressure of the lower part of the casing-cement sheath-formation combination, and the pressure of blowby to the upper part of the casing-cement sheath-formation combination. The output of the evaluation value determination layer may include the evaluation value.

In some embodiments, the evaluation value determination model may be obtained through separate training or joint training. For example, the pressure determination layer and the evaluation value determination layer may be obtained through joint training, and then the evaluation value determination model may be obtained. The output of the pressure determination layer may be used as the input of the evaluation value determination layer.

For example, sample data may be input to an initial pressure determination layer, the sample data may include multi-history data and/or simulation software simulation data, the blowby pressure curve of the casing-cement sheath-formation combination, the channeling pressure of the lower part of the casing-cement sheath-formation combination, and the pressure of blowby to the upper part of the casing-cement sheath-formation combination output by the initial pressure determination layer may be obtained, which may be input into the initial evaluation value determination layer, and the evaluation value output by the initial evaluation value determination layer may be obtained. The manually labeled evaluation values based on monitored and/or simulated pressure values corresponding to each set of sample data may be used to verify the output results of the initial evaluation value determination layer to obtain verification data of the output result of the initial evaluation value determination layer using the back-propagation characteristics of the neural network model, and the verification data may be used to continue the training until the trained pressure determination layer and evaluation value determination layer are obtained.

For another example, the sample data may also be input into the initial pressure determination layer, and the output result of the initial pressure determination layer may be input into the initial evaluation value determination layer, and the loss function may be constructed based on labels (manually labeled evaluation values based on the monitored and/or simulated pressure value corresponding to each set of sample data) and the output result of the initial evaluation value determination layer. At the same time, the parameters of the initial pressure determination layer and the initial evaluation value determination layer may be updated until the initial pressure determination layer and the initial evaluation value determination layer meet the preset conditions, and the trained pressure determination layer and the trained evaluation value determination layer are obtained. The preset condition may be that the loss function is less than the threshold, converges, or the training period reaches the threshold. In some embodiments, the method of iteratively updating model parameters may include conventional model training methods such as stochastic gradient descent.

In some embodiments, the output of the evaluation value determination model may also include the corresponding confidence levels of the blowby pressure curve of the casing-cement sheath-formation combination, the channeling pressure of the lower part of the casing-cement sheath-formation combination, and the blowby pressure of blowby to the upper part of the casing-cement sheath-formation combination. The confidence level may indicate the credibility of the output results. In some embodiments, a corresponding confidence level threshold may be set for each output result, and when the corresponding confidence level of each output result is greater than the corresponding confidence level threshold, it means that the output result is highly reliable. In some embodiments, the confidence level thresholds corresponding to each output result may be the same or different. During training, the label of confidence level of the sample data corresponding to the historical data is the first preset value (e.g., 1), and the label of confidence level of the sample data corresponding to the simulation software simulation data is the second preset value (e.g., 0.5).

In some embodiments, the determination of the second candidate optimization parameter combination may be related to a confidence level. The confidence level may play a role in increasing the selection range to a certain extent. For example, based on the original requirements, if one or more of the blowby pressure curve of the casing-cement sheath-formation combination, the channeling pressure of the lower part of the casing-cement sheath-formation combination, and the pressure of blowby to the upper part of the casing-cement sheath-formation combination output by the evaluation value determination model are not good enough, and the corresponding first candidate optimization parameter combination (individual) may be eliminated. However, if the corresponding confidence level of the output of the evaluation value determination model is low, it may be considered that the first candidate optimization parameter combination may not be eliminated temporarily. Because the confidence level is low, and the accuracy of the above-mentioned corresponding output pressure is low, so the first candidate optimization parameter combination may be temporarily remained in the population to continue to observe, and individuals with low confidence level in subsequent iterations may have a higher probability to transform.

The optimizing the design parameters of seal integrity of the wellbore may be accomplished in various ways. In some embodiments, optimizing the design parameters of seal integrity of the wellbore may be achieved based on any one or more of optimizing the cement slurry system, optimizing the design cementing conditions, and optimizing the adjustment of production operating parameters.

In some embodiments, the manner of determining the optimizing the design parameters of seal integrity of the wellbore may include the following operations. The estimated optimization effectiveness of optimizing the cement slurry system, optimizing the design of cementing conditions, and optimizing the adjustment of production operating parameters may be evaluated. The way of optimizing the design parameters of seal integrity of the wellbore may be determined based on the optimization effectiveness.

In some embodiments, for these three optimization directions of optimizing the cement slurry system, optimizing the design of the cementing conditions, and optimizing and adjustment of the production operation parameters, selecting the optimizable parameters of one of the optimization directions to be optimized as the optimization scheme or selecting the optimizable parameters of various optimization directions to be optimized as the optimization scheme may be determined by the optimization effectiveness. The optimization effectiveness may refer to the parameters related to the selection of the optimization direction. The greater the optimization effectiveness of a certain optimization direction is, the greater the practicability and effectiveness of the optimization scheme obtained by the optimization based on the optimization direction is. In some embodiments, one or more optimization directions whose optimization effectiveness is greater than a preset threshold may be selected, and an optimization scheme may be determined based on the selected optimization directions. The optimization effectiveness may be determined in a variety of feasible ways. For example, it may be determined using the selection rate, which may be determined based on the dimension scale of the optimization direction.

The dimension scale may be used to describe the scale of the combination of optimizable parameters contained in the optimization direction. In some embodiments, the dimension scale may be determined based on the number of optimizable parameters in the optimization direction, and the number of optional values for each optimizable parameter (e.g., multiplying). For example, the number of optimizable parameters in the optimization direction of "optimizing the cement slurry system" is 3 (e.g., optimizable parameters include: selection of cement slurry system, selection of reinforcing agent, selection of fluid loss agent), and the number of optional values for each optimizable parameter is 3, 6, and 7, and the dimension scale is 3×6×7=126.

In some embodiments, the selection rate of the optimization direction may be calculated based on the historical data, the historical simulation data, etc. The selection rate of the optimization direction is equal to the number of parameter combinations selected in the optimization direction/dimension scale. The selected parameter combination may be the one used in historical data with better effect and/or the one selected in historical simulation data with better effect. The calculated selection rate may be used as the optimization effectiveness of this dimension. For example, if a certain optimization direction includes an optimizable parameter A and an optimizable parameter B, the optimizable parameter A may include optional values a1, a2 and a3, and the optimizable parameter B may include optional values b1, b2 and b3, then the dimension scale of the optimization direction is 3×3=9, that is, there are 9 optional parameter combinations in the optimization direction, and if 3 parameter combinations have been used with the good effect among the optional 9 parameter combinations of the optimizable parameter A and the optimizable parameter B based on historical data, then the selection rate of this optimization direction is 33.3% (3/9=33.3%).

In some embodiments, for the aforementioned selected first candidate optimization parameter combination to be transformed, each candidate optimization parameter in each group of candidate optimization parameter combinations may belong to an optimization direction, for example, the first candidate optimization parameter combination may include optimizable parameters in three optimization directions, i.e., the optimizable parameters of optimizing the optimization direction of the parameters of the cement slurry system, the optimizable parameters of optimizing the optimization direction of optimizing the design of the cementing conditions, and the optimizable parameters of optimizing the optimization direction of optimizing the adjustment of the production operation parameters. In some embodiments, the optimization effectiveness of each optimization direction may be obtained. For the optimization direction with a low optimization effectiveness, because its optimization effectiveness is low, the optimization of the parameters belonging to the optimization direction in the candidate optimization parameter combination is of little significance, and such parameters may not be transformed (e.g., using originally generated values) as much as possible. For the optimization direction with a high optimization effectiveness, the parameters belonging to the optimization direction in the candidate optimization parameter combination may be transformed (e.g., by crossover, mutation, etc.) with a higher probability, so that it is convenient to quickly find a better solution. More descriptions of the obtaining method of the optimization effectiveness, reference may be found in the related descriptions of the aforementioned selection of optimization scheme, which may not be repeated here.

In some embodiments, by providing the evaluation apparatus for seal integrity of the wellbore in the full life cycle, it may finely simulate the systemic effects of the wellbore barrier correlation such as extremely harsh wellbore oil pipe, casing, annular space and formation temperature and pressure cyclic alternating, oil casing bulging effect, vibration effect, fluid phase change, and cyclic alternating load on its seal integrity.

In some embodiments, the experimental parameters may be adjusted based on the load of the casing-cement sheath-formation combination and the effect of cyclic alternating temperature and pressure under the actual wellbore operation conditions, which is more suitable for simulating extremely severe wellbore operation conditions.

In some embodiments, by simulating and testing the blowby pressure curves of oil and gas wells in the full life cycle under various production operation conditions, and analyzing and evaluating the seal integrity of the wellbore and critical blowby pressure within the scope of the full life cycle, it may provide experimental methods and data support for cement slurry system optimization, cementing parameter optimization and the formulation of the assurance measures of the seal integrity of the wellbore.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers that describe the number of components and attributes are used. It should be understood that such numbers used to describe the embodiments are modified by the modifiers "approximately", "approximately" or "generally" in some examples. For example, "about," "approximate," or "substantially" may indicate ±20% variation of the value it describes, unless otherwise stated. Accordingly, in some embodiments, the numerical parameters set forth in the description and attached claims are approximations that may vary depending upon the desired properties sought to be obtained by a particular embodiment. In some embodiments, the numerical parameters should be construed in light of the count of reported significant digits and by applying ordinary rounding techniques.

Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the disclosure herein are illustrative of the principles of the embodiments of the disclosure. Other modifications that may be employed may be within the scope of the application. Thus, by way of example, but not of limitation, alternative configurations of the embodiments of the disclosure may be utilized in accordance with the teachings herein. Accordingly, embodiments of the present disclosure are not limited to those explicitly introduced and described in the disclosure.

What is claimed is:

1. An evaluation apparatus for seal integrity of a wellbore in a full life cycle, comprising an oil pipe temperature and pressure simulation assembly, an oil casing annular temperature and pressure simulation assembly, a formation confining pressure simulation assembly, a casing-cement sheath-formation combination preparation assembly, a blowby characteristic detection assembly, and a monitoring system;

the oil pipe temperature and pressure simulation assembly including an oil pipe, an oil pipe booster pump, and a heating and cooling cycle apparatus that are connected in sequence to form a loop, and an outflow port of the oil pipe being connected with an input end of the oil pipe booster pump; an output end of the heating and cooling cycle apparatus being connected with an inflow port of the oil pipe, and the connected oil pipe being provided with an oil pipe valve that flows in a direction from the heating and cooling cycle apparatus to the oil pipe; and an oil pipe temperature and pressure sensor being arranged in the oil pipe;

the oil casing annular temperature and pressure simulation assembly including a casing and a booster pump, the casing being coaxial with the oil pipe, and an oil casing annular space being formed between an inner surface of the casing and an outer surface of the oil pipe by sealing, the booster pump being communicated with the oil casing annular space through an oil casing annular space pressure pipeline, the oil casing annular space pressure pipeline being provided with an oil casing annular space valve, and an oil casing annular space temperature and pressure sensor being arranged in the oil casing annular space;

the formation confining pressure simulation assembly including a high-pressure cylinder, a heating sleeve, a high-pressure cylinder plug, and a formation confining pressure pipeline, the heating sleeve being sleeved on an outer surface of the high-pressure cylinder, and the high-pressure cylinder and the casing being coaxially arranged, and a closed space being formed between an inner surface of the high-pressure cylinder and an outer surface of the casing through the high-pressure cylinder plug, one end of the formation confining pressure pipeline being communicated with the closed space, and other end of the formation confining pressure pipeline being connected with the booster pump, and the formation confining pressure pipeline being provided with a formation confining pressure valve, and a formation temperature and pressure sensor being arranged in the closed space; wherein the high-pressure cylinder refers to a member that is coaxially arranged on an outer layer of the casing and is configured to withstand external pressure, and the high-pressure cylinder plug is a member for sealing a space between the inner surface of the high-pressure cylinder and the outer surface of the casing;

the casing-cement sheath-formation combination preparation assembly being arranged in the closed space, including a formation rock, a sealing sleeve, an upper core plug, a lower core plug, and a combination fastener, and the sealing sleeve is sleeved on an outer surface of the formation rock, the formation rock and the casing being arranged coaxially, and a cement sheath space being formed between an inner surface of the formation rock and an outer surface of the casing, a cement sheath being formed by injecting a cement slurry system into the cement sheath space for solidification, a bottom of the upper core plug and a bottom of the lower core plug being provided with pressure grooves, and the pressure grooves being communicated with the cement sheath space, and the pressure groove of the lower core plug being connected with the booster pump through a pressure detection inlet pipeline, and the pressure detection inlet pipeline being provided with a channeling pressure sensor and a channeling valve in turn; the pressure groove of the upper core plug being connected with a blowby pressure sensor through a pressure detection outlet pipeline; and the combination fastener being configured to fix a whole formed by the cement sheath, the formation rock, the sealing sleeve, the upper core plug, and the lower core plug on the casing to prevent the whole from sliding on the casing; wherein the combination fastener includes a sealing sleeve fixing flange, a combination tensioning flange, a tie rod, a sealing sleeve core plug sealing assembly, a tensioning flange core plug sealing assembly, a tensioning flange sealing flange, a tensioning flange sealing flange bolt, and a combination tensioning flange bolt;

the blowby characteristic detection assembly including the pressure detection inlet pipeline, the pressure detection outlet pipeline, the pressure grooves, the booster pump, the channeling pressure sensor, the blowby pressure sensor, the channeling valve, and the monitoring system for realizing a real-time monitoring of a critical blowby pressure of the cement sheath; and the monitoring system being respectively connected with the oil pipe temperature and pressure sensor, the oil casing annular space temperature and pressure sensor, the formation temperature and pressure sensor, the channeling pressure sensor, and the blowby pressure sensor for realizing real-time monitoring and data curve recording of temperature and pressure conditions of each assembly.

2. The evaluation apparatus for the seal integrity of the wellbore in the full life cycle according to claim 1, wherein the sealing sleeve is a copper sleeve.

3. The evaluation apparatus for the seal integrity of the wellbore in the full life cycle according to claim 2, wherein the copper sleeve is made of red copper.

4. The evaluation apparatus for the seal integrity of the wellbore in the full life cycle according to claim 1, wherein the casing and the oil pipe, the casing and the high-pressure cylinder plug, the high-pressure cylinder plug and the high-pressure cylinder, the upper core plug and the casing, and the lower core plug and the casing are all connected by flanges and bolts.

5. The evaluation apparatus for the seal integrity of the wellbore in the full life cycle according to claim 1, wherein seal assemblies are provided between components connected by the flanges.

6. The evaluation apparatus for the seal integrity of the wellbore in the full life cycle according to claim 1, wherein the combination fastener includes a sealing sleeve fixing flange, an combination tensioning flange, a tie rod, and a sealing sleeve core plug sealing assembly, a tensioning flange core plug sealing assembly, a tensioning flange seal flange, a tensioning flange sealing flange bolt and a combination tensioning flange bolt, one end of the tie rod passes through the combination tensioning flange at top of the whole and is fastened by the combination tensioning flange bolt, and other end of the tie rod passes through the combination tensioning flange at bottom of the whole and is fastened by the combination tensioning flange bolt.

7. The evaluation apparatus for the seal integrity of the wellbore in the full life cycle according to claim 1, further comprising a heating apparatus, which is arranged in the oil pipe.

8. An evaluation method for seal integrity of a wellbore in a full life cycle, which is implemented by an evaluation apparatus for the seal integrity of the wellbore in the full life cycle, comprising:

S1, designing an evaluation apparatus for seal integrity of a wellbore in a full life cycle with size parameters of an oil pipe, a casing, and a cement sheath consistent with or similar to a target well section of a target well based on wellbore parameters and working conditions of a target well section of a target well to obtain the evaluation apparatus of the target well section; analyzing operation conditions of the target well in the full life cycle, and determining a temperature, a pressure and fluctuations of the temperature and pressure of an oil pipe, an oil casing annular space and a formation caused by various operation conditions; and determining a fluid composition, a gas-liquid multiphase flow state, and a transition condition of a critical state in the oil pipe and the oil casing annular space, determining a formation pressure and fluctuation of the formation pressure under the various operation conditions based on production operation well history data of the target well, wherein the evaluation apparatus includes an oil pipe temperature and pressure simulation assembly, an oil casing annular temperature and pressure simulation assembly, a formation confining pressure simulation assembly, a casing-cement sheath-formation combination preparation assembly, a blowby characteristic detection assembly, and a monitoring system;

S2: carrying out a pressure test on the evaluation apparatus to determine that a temperature resistance performance, a pressure bearing performance and a sealing performance of the evaluation apparatus meet experimental requirements of the target well section; and determining a temperature and pressure alternating, a fluid phase transition and experimental period parameter of each assembly of the evaluation apparatus;

S3: based on actual cementing working condition of the target wellbore section, controlling temperatures of the oil pipe, a casing and a formation rock through a heating sleeve, and simulating a steady-state heat transfer state of the oil pipe, the casing and the formation rock under a cementing condition through adding wellbore working fluid to the oil pipe and the casing; controlling an internal temperature and pressure of the oil pipe through an oil pipe booster pump, a heating and cooling cycle apparatus, and an oil pipe temperature and pressure sensor, and controlling a temperature and pressure of the oil casing annular space through the a booster pump, an oil casing annular space temperature and pressure sensor, and an oil casing annular space valve, controlling a temperature and pressure of the formation rock through the heating sleeve, the booster pump, a formation temperature and pressure sensor, a formation confining pressure valve to stably maintain a balanced state of each assembly, injecting a cement slurry system into a cement sheath space until the cement slurry system is solidified and a cementing operation period is completed, and completing a solidification of the casing-cement sheath-formation combination;

S4: based on production operation conditions determined in S1 and S2, controlling the temperatures of the oil pipe, the casing and the formation rock through the heating sleeve, introducing a gas-liquid phase medium into the oil pipe under the production operation conditions, and introducing an annular protective fluid or a wellbore working fluid into the casing, and controlling an alternating simulation of the internal temperature, a pressure, a fluid phase change, a vibration, a bulge and deformation state of the oil pipe through the oil pipe booster pump, the heating and cooling cycle apparatus, the oil pipe temperature and pressure sensor, and an oil pipe valve; controlling the alternate simulation of the temperature, the pressure, the fluid phase change, the vibration, the bulge and deformation state of the oil casing annular space through the booster pump, the oil casing annular space temperature and pressure sensor, and the oil casing annular space valve; controlling the alternating simulation of formation temperature and formation pressure and crustal stress around the wellbore through the heating sleeve, the booster pump, the formation temperature and pressure sensor, the formation confining pressure valve; recording and controlling a data curve of the each assembly of the evaluation apparatus through the monitoring system until the production operation period is completed, completing an alternating maintenance of the casing-cement sheath-formation combination;

S5: at any time during a production process, applying a set pressure along a lower part of the casing-cement sheath-formation combination through a pressure detection inlet pipeline, the booster pump, a channeling pressure sensor, and a channeling valve, and monitoring a blowby pressure curve of a upper part of the casing-cement sheath-formation combination in real time through a pressure detection outlet pipeline, a blowby pressure sensor, and the monitoring system to obtain a real-time blowby pressure curve of the casing-cement sheath-formation combination under corresponding production operation conditions after cementing is completed;

S6: repeating the S3-S5 to obtain the blowby pressure curve of the casing-cement sheath-formation combination of the target well under various production operation conditions;

S7: combining the blowby pressure curve of the casing-cement sheath-formation combination under various production operation conditions with a channeling pressure of the lower part of the casing-cement sheath-formation combination, a pressure of blowby to the upper part of the casing-cement sheath-formation combination, and the internal blowby channel situation, analyzing and determining whether the cement slurry system injected in the S3 meets the seal integrity and critical blowby pressure requirements of the target well of each production operation condition in the full life cycle, in response to a determination that the cement slurry system meets the seal integrity and critical blowby pressure requirements, the cement slurry system, the cementing conditions, and the production operation conditions of the wellbore meeting the requirements of the seal integrity of the wellbore in the full life cycle; and in response to a determination that the cement slurry system does not meet the seal integrity and critical blowby pressure requirements, optimizing the design parameters of the seal integrity of the wellbore, and repeating the S1-S7 until a critical blowby pressure of the cement sheath meets the requirements of the seal integrity of the wellbore in the full life cycle.

9. The evaluation method for the seal integrity of the wellbore in the full life cycle according to claim 8, wherein when evaluating thermal recovery well, geothermal well or high temperature and high pressure well as the target well, in the S4, when the oil pipe is heated, a heating apparatus is inserted into the oil pipe to simulate that the oil pipe, the casing and the formation rock are in an unsteady heat transfer state.

10. The evaluation method for the seal integrity of the wellbore in the full life cycle according to claim 8, wherein in the S7, the optimizing the design parameters of seal integrity of the wellbore is realized by any one or more of optimizing the cement slurry system, optimizing a design of the cementing conditions, and optimizing an adjustment of the production operation parameters.

* * * * *